United States Patent
Murphy et al.

[19]

[11] Patent Number: 6,157,522
[45] Date of Patent: Dec. 5, 2000

[54] SUSPENSION-LEVEL MICROACTUATOR

[75] Inventors: James Morgan Murphy, Boulder, Colo.; Richard August Budde, Plymouth, Minn.

[73] Assignee: Seagate Technology LLC, Scotts Valley, Calif.

[21] Appl. No.: 09/240,116

[22] Filed: Jan. 29, 1999

Related U.S. Application Data

[60] Provisional application No. 60/081,058, Apr. 7, 1998.

[51] Int. Cl.[7] .................................................. G11B 5/596
[52] U.S. Cl. ..................................... 360/294.6; 360/294.4
[58] Field of Search .............................. 360/294.4, 294.6

[56] References Cited

U.S. PATENT DOCUMENTS

| | | | |
|---|---|---|---|
| 3,678,482 | 7/1972 | Billawala | 340/174.1 |
| 3,924,268 | 12/1975 | McIntosh et al. | 360/78 |
| 4,374,402 | 2/1983 | Blessom et al. | 360/104 |
| 4,605,977 | 8/1986 | Matthews | 360/103 |
| 4,620,251 | 10/1986 | Gitzendanner | 360/103 |
| 4,651,242 | 3/1987 | Hirano et al. | 360/103 |
| 4,764,829 | 8/1988 | Makino | 360/106 |
| 4,853,810 | 8/1989 | Pohl et al. | 360/103 |
| 4,914,725 | 4/1990 | Belser et al. | 318/560 |
| 5,021,906 | 6/1991 | Chang et al. | 360/103 |
| 5,034,828 | 7/1991 | Ananth et al. | 360/75 |
| 5,065,268 | 11/1991 | Hagen | 360/104 |
| 5,079,659 | 1/1992 | Hagen | 360/104 |
| 5,105,408 | 4/1992 | Lee et al. | 369/44.15 |
| 5,177,652 | 1/1993 | Yamaguchi et al. | 360/78.05 |
| 5,189,578 | 2/1993 | Mori et al. | 360/106 |
| 5,255,016 | 10/1993 | Usui et al. | 346/140 |
| 5,276,573 | 1/1994 | Harada et al. | 360/103 |
| 5,303,105 | 4/1994 | Jorgenson | 360/106 |
| 5,521,778 | 5/1996 | Boutaghou | 360/106 |
| 5,552,809 | 9/1996 | Hosono et al. | 347/10 |
| 5,623,461 | 4/1997 | Sohmuta | 369/32 |
| 5,657,188 | 8/1997 | Jurgenson et al. | 360/106 |
| 5,745,319 | 4/1998 | Takekado et al. | 360/78.05 |
| 5,764,444 | 6/1998 | Imamura et al. | 360/109 |
| 5,781,381 | 7/1998 | Koganezawa et al. | 360/106 |
| 5,793,571 | 8/1998 | Jurgenson et al. | 360/104 |
| 5,796,558 | 8/1998 | Hanrahan et al. | 360/106 |
| 5,805,382 | 9/1998 | Lee et al. | 360/104 |
| 5,867,347 | 2/1999 | Knight et al. | 360/104 |
| 5,896,246 | 4/1999 | Budde et al. | 360/104 |
| 5,898,541 | 4/1999 | Boutaghou et al. | 360/109 |
| 6,025,975 | 2/2000 | Fard et al. | 360/294.4 |

FOREIGN PATENT DOCUMENTS

| | | |
|---|---|---|
| 0 412 221 B1 | 11/1989 | European Pat. Off. . |
| 63-122069 | 5/1988 | Japan . |
| 2-263369 | 4/1989 | Japan . |
| 4-134681 | 5/1992 | Japan . |
| 4-368676 | 12/1992 | Japan . |
| 5-094682 | 4/1993 | Japan . |
| 6-020412 | 1/1994 | Japan . |
| 7-085621 | 3/1995 | Japan . |

OTHER PUBLICATIONS

"Silicon Micromachined Electromagnetic Microactuators for Rigid Disk Drives" by Tang et al, *IEEE Transactions on Magnetics*, vol. 31, No. 6, Nov. 1995.

(List continued on next page.)

*Primary Examiner*—Robert S. Tupper
*Attorney, Agent, or Firm*—Kinney & Lange, P.A.

[57] ABSTRACT

A microactuator is disclosed for selectively altering a position of a transducing head carried by a slider in a disc drive system with respect to a track of a rotatable disc having a plurality of concentric tracks. The disc drive system includes a head mounting block for attachment to an actuator arm and a head suspension supporting the slider over the rotatable disc. The microactuator includes a piezoelectric element attached between the head mounting block and the head suspension and beams connecting the head mounting block and the head suspension. The piezoelectric element is deformable in response to a voltage applied thereto. The beams are flexible to permit movement of the head suspension with respect to the head mounting block upon deformation of the piezoelectric elements, and have heights extending out of the general plane of the head mounting block and the head suspension.

15 Claims, 5 Drawing Sheets

OTHER PUBLICATIONS

"Magnetic Recording Head Positioning at Very High Track Densities Using a Microactuator–Based, Two–Stage Servo System" by Fan et al., *IEEE Transactions on Industrial Electronics*, vol. 42, No. 3, Jun. 1995.

"A Flexural Piggyback Milli–Actuator for Over 5 Gbit/in$^2$ Density Magnetic Recording" by Koganezawa et al, *IEEE Transactions on Magnetics*, vol. 32, No. 5, Sep. 1996.

"Transverse Mode Electrostatic Microactuator for MEMS–Based HDD Slider" by Imamura et al, *IEEE* 1996.

"An Experiment for Head Positioning System Using Sub-micron Track–width GMR Head" by Yoshikawa et al., *IEEE Transactions on Magnetics*, vol. 32, No. 5, Sep. 1996.

"Micro Electrostatic Actuators in Dual–Stage Disk Drives with High Track Density" by Tang et al., *IEEE Transactions on Magnetics*, vol. 32, No. 5, Sep. 1996.

"Piezoelectric Microactuator Compensating for Off–Track Errors in Magnetic Disk Drives" by Imamura et al, *Advance Information Storage Systems*, vol. 5, pp 119–125, m/year omitted.

"A Dual–Stage Magnetic Disk Drive Actuator Using a Piezoelectric Device for a High Track Density" by Mori et al., *IEEE Transactions on Magnetics*, vol. 27, No. 6, Nov. 1991.

"Dynamic Loading Criteria for 3–1/2 Inch Inline HDD Using Multilayer Piezoelectric Load/Unload Mechanism" by Kajitani et al., *IEEE Transactions on Magnetics*, vol. 27, No. 6, Nov. 1991.

"Design, Fabrication, and Testing of Silicon Microgimbals for Super–Compact Rigid Disk Drives" by Temesvary et al., *Journal of Microelectromechanical Systems*, vol. 4, N, m/year omitted.

SUSPENSION-LEVEL MICROACTUATOR

CROSS-REFERENCE TO RELATED APPLICATION(S)

This application claims priority from Provisional Application Ser. No. 60/081,058 filed Apr. 7, 1998, entitled "Piezoelectrically-Actuated Suspension-Level Microactuator" by J. Murphy and R. Budde.

BACKGROUND OF THE INVENTION

The present invention relates to a suspension-level microactuator, and more particularly to a microactuator located between a suspension and an actuator arm in a disc drive system having bendable beams outside of the general plane of the suspension to selectively move a transducing head radially with respect to a rotatable disc.

The density of concentric data tracks on magnetic discs continues to increase (that is, the size of data tracks and radial spacing between data tracks are decreasing), requiring more precise radial positioning of the head. Conventionally, head positioning is accomplished by operating an actuator arm with a large-scale actuation motor, such as a voice coil motor, to radially position a head on a flexure at the end of the actuator arm. The large-scale motor lacks sufficient resolution to effectively accommodate high track-density discs. Thus, a high resolution head positioning mechanism, or microactuator, is necessary to accommodate the more densely spaced tracks.

One promising design for high resolution head positioning involves employing a high resolution microactuator in addition to the conventional low resolution actuator motor, thereby effecting head positioning through dual-stage actuation. Various microactuator designs have been considered to accomplish high resolution head positioning. However, these designs all had shortcomings that limited the effectiveness of the microactuator. Many designs increased the complexity of designing and assembling the existing components of the disc drive, while other designs were unable to achieve the force and bandwidth necessary to accommodate rapid track access. Therefore, the prior designs did not present ideal microactuator solutions.

There is a need in the art for a simple microactuator design to provide efficient high resolution head positioning in a dual-stage actuation system, that can be implemented by readily available manufacturing processes.

BRIEF SUMMARY OF THE INVENTION

The present invention is a microactuator for selectively altering a position of a transducing head carried by a slider in a disc drive system with respect to a track of a rotatable disc having a plurality of concentric tracks. The disc drive system includes a head mounting block for attachment to an actuator arm and a head suspension supporting the slider over the rotatable disc. The microactuator includes a first piezoelectric element attached between the head mounting block and the head suspension and a first beam attached between the head mounting block and the head suspension. The first piezoelectric element is deformable in response to a voltage applied thereto. The first beam is flexible to permit movement of the head suspension with respect to the head mounting block, and has a height extending out of the general plane of the head mounting block and the head suspension.

In one embodiment, a second piezoelectric element is attached between the head mounting block and the head suspension, and a second beam is attached between the head mounting block and the head suspension. The second piezoelectric element is deformable in a direction complementary to deformation of the first piezoelectric element in response to a voltage applied thereto. The second beam is flexible to permit movement of the head suspension with respect to the head mounting block, and has a height extending out of the general plane of the head mounting block and the head suspension.

DETAILED DESCRIPTION

Figure 1:
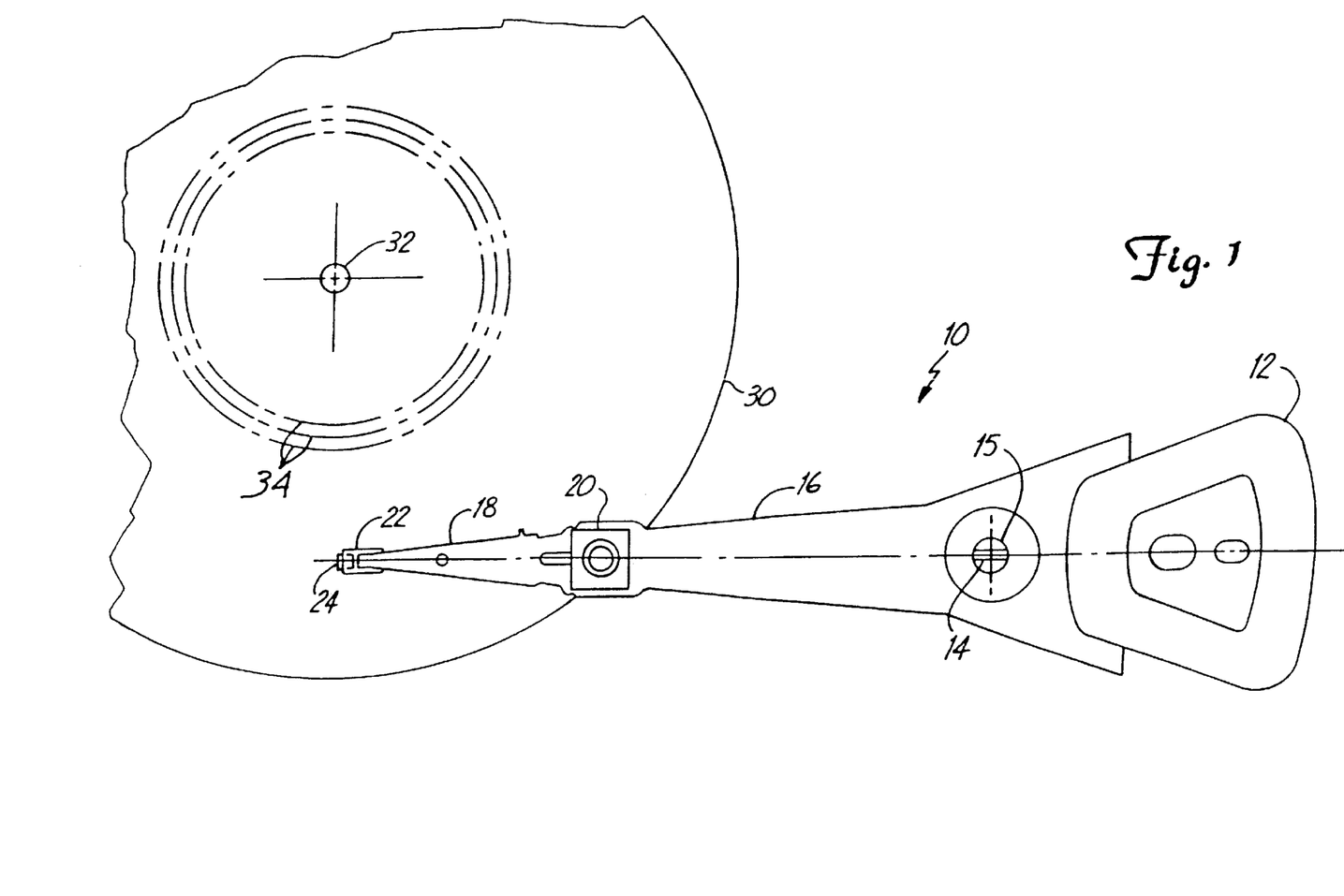
FIG. 1 is a top view of a disc drive actuation system for positioning a slider over tracks of a disc.

FIG. 1 is a top view of a disc drive actuation system 10 for positioning slider 24 over a track 34 of disc 30. Actuation system 10 includes voice coil motor (VCM) 12 arranged to rotate actuator arm 16 around axis 14 on spindle 15. Head suspension 18 is connected to actuator arm 16 at head mounting block 20. Flexure 22 is connected to an end of head suspension 18 and carries slider 24. Slider 24 carries a transducing head (not shown in FIG. 1) for reading and/or writing data on concentric tracks 34 of disc 30. Disc 30 rotates around axis 32, so that windage is encountered by slider 24 to keep it aloft a small distance above the surface of disc 30.

VCM 12 is selectively operated to move actuator arm around axis 14, thereby moving slider 24 between tracks 34 of disc 30. However, for disc drive systems with high track density, VCM 12 lacks sufficient resolution and frequency response to position a transducing head on slider 24 over a selected track 34 of disc 30. Therefore, a higher resolution actuation device is necessary.

Figure 2:
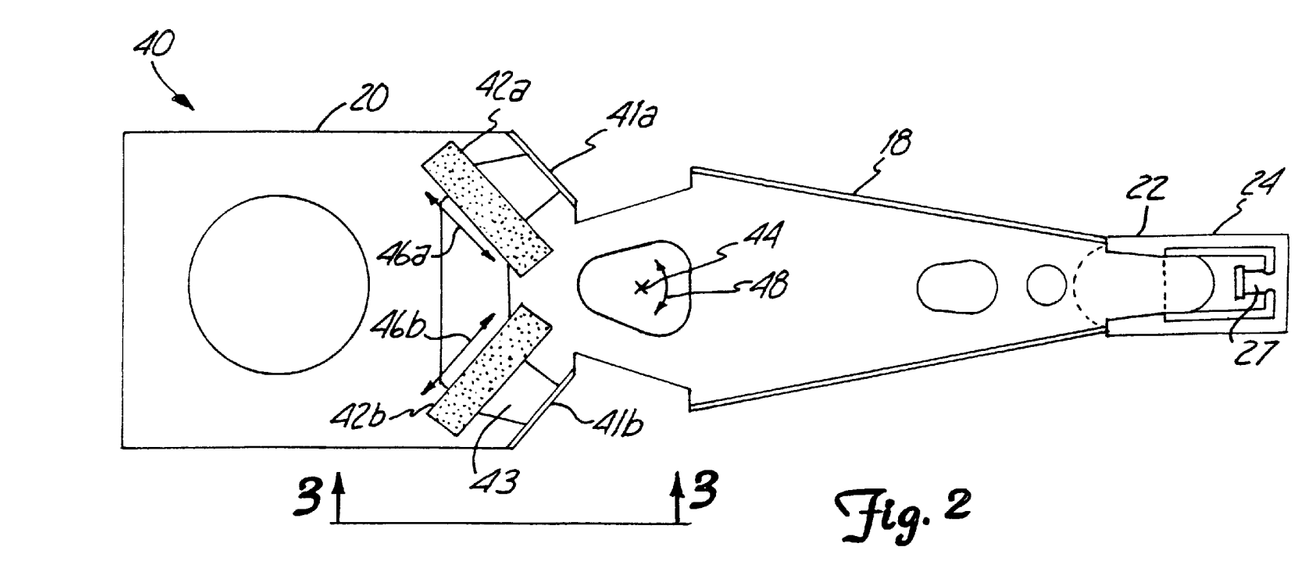
FIG. 2 is a top view of a microactuation system for use in a dual-stage disc drive actuation system for high resolution positioning of a slider according to a first embodiment of the present invention.
Figure 3:
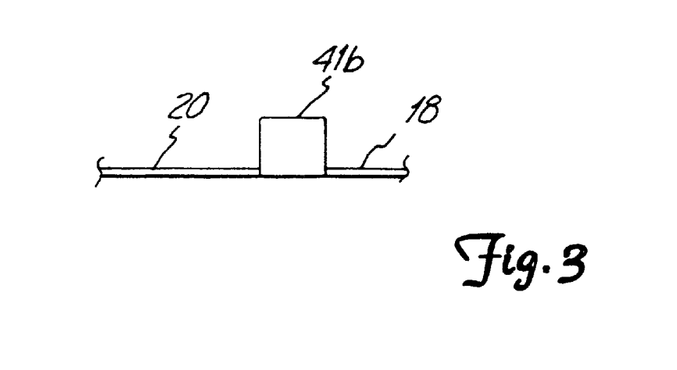
FIG. 3 is a side view taken along line 3—3 in FIG. 2 with intersecting portions shown in section.

FIG. 2 is a top view, and FIG. 3 is a side view taken along line 3—3 of FIG. 2 with intersecting portions shown in section, of microactuation system 40 for use in a dual-stage disc drive actuation system for high resolution positioning of slider 24 according to a first embodiment of the present invention. Head mounting block 20 includes beams 41a and 41b for connection to head suspension 18. Head mounting block 20, beams 41a and 41b and head suspension 18 may be formed of a single sheet of material, with beams 41a and 41b bent normal to the general plane of head mounting block 20 and head suspension 18, and with aperture 43 extending between beams 41a and 41b between head mounting block 20 and head suspension 18. Beams 41a and 41b are oriented at an angle to each other, such that virtual pivot 44 is formed at the intersection of two lines continued from beams 41a and 41b. Beams 41a and 41b present a stiffness to resist movements other than rotation about virtual pivot 44. Piezoelectric elements 42a and 42b are mounted to head mounting block 20 and head suspension 18, generally parallel to beams 41a and 41b, respectively, across aperture 43. Piezoelectric elements 42a and 42b are deformable longitudinally in the directions of arrows 46a and 46b, respectively, in response to an applied voltage across the elements. Expansion and contraction of piezoelectric elements 42a and 42b results in deformation of beams 41a and 41b, causing rotation of head suspension 18 and slider 24 about virtual pivot 44 in the direction of arrows 48. Thus, a controlled voltage applied to piezoelectric elements 42a and 42b may be utilized to effect high resolution positioning of a transducing head carried by slider 24.

It is significant that beams 41a and 41b are configured with a height that extends out of the general plane of head suspension 18 and head mounting block 20. This arrangement provides compliance for rotation about virtual pivot 44 so that the microactuator structure moves slider 24 across the tracks of a disc, while providing substantial stiffness in other directions to resist undesired movements and vibrations out of the plane of cross-track movement. As a result, conventional materials may be used for head mounting block 20 and head suspension 18. In prior art devices where beams were configured in the same general plane as head mounting block 20 and head suspension 18, the inadequate vertical stiffness of the microactuator structure required thicker materials for head suspension 18, which tended to degrade the mechanical performance of the microactuator.

Figure 4:
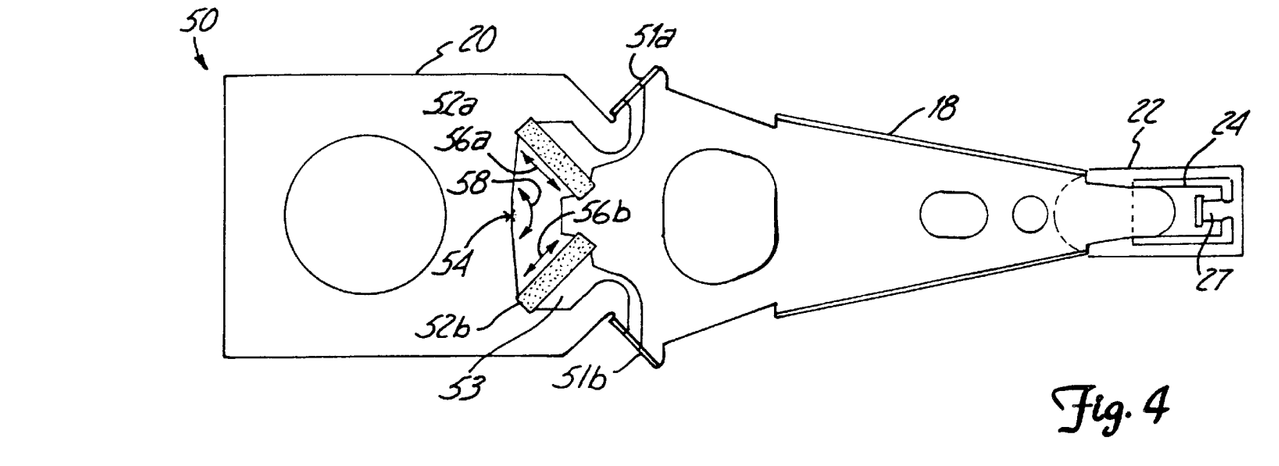
FIG. 4 is a top view of a microactuation system for use in a dual-stage disc drive actuation system for high resolution positioning of a slider according to a second embodiment of the present invention.

FIG. 4 is a top view of microactuation system 50 for use in a dual-stage disc drive actuation system for high resolution positioning of slider 24 according to a second embodiment of the present invention. Beams 51a and 51b are arranged to connect head suspension 18 to head mounting block 20. Head mounting block 20, beams 51a and 51b and head suspension 18 may be formed of a single sheet of material, with beams 51a and 51b bent normal to the general plane of head mounting block 20 and head suspension 18, similar to beams 41a and 41b shown in FIGS. 2 and 3. Aperture 53 extends between beams 51a and 51b between head mounting block 20 and head suspension 18. Beams 51a and 51b are oriented at an angle to each other, such that virtual pivot 54 is formed at the intersection of two lines continued from beams 51a and 51b. Beams 51a and 51b present a stiffness to resist movements other than rotation about virtual pivot 54. Piezoelectric elements 52a and 52b are connected between head mounting block 20 and head suspension 18, generally perpendicular to beams 51a and 52b, respectively, across aperture 53. Piezoelectric elements 52a and 52b are deformable longitudinally in the directions of arrows 56a and 56b, respectively, in response to an applied voltage across the elements. Expansion and contraction of piezoelectric elements 52a and 52b results in deformation in beams 51a and 51b, causing rotation of head suspension 18 and slider 24 about virtual pivot 54 in the direction of arrows 58. Thus, a controlled voltage applied to piezoelectric elements 52a and 52b may be utilized to effect high resolution positioning of a transducing head carried by slider 24.

Microactuation system 50 shown in FIG. 4 is similar to microactuation system 40 shown in FIGS. 2 and 3, except that beams 51a and 51b are arranged to provide virtual pivot 54 further away from slider 24. This arrangement amplifies the movement of slider 24 for a given angular deflection produced by microactuator 50. Beams 51a and 51b have a height extending out of the general plane of heads suspension 18 and head mounting block 20 to provide the stiffness advantages described above with respect to FIGS. 2 and 3.

Figure 5:
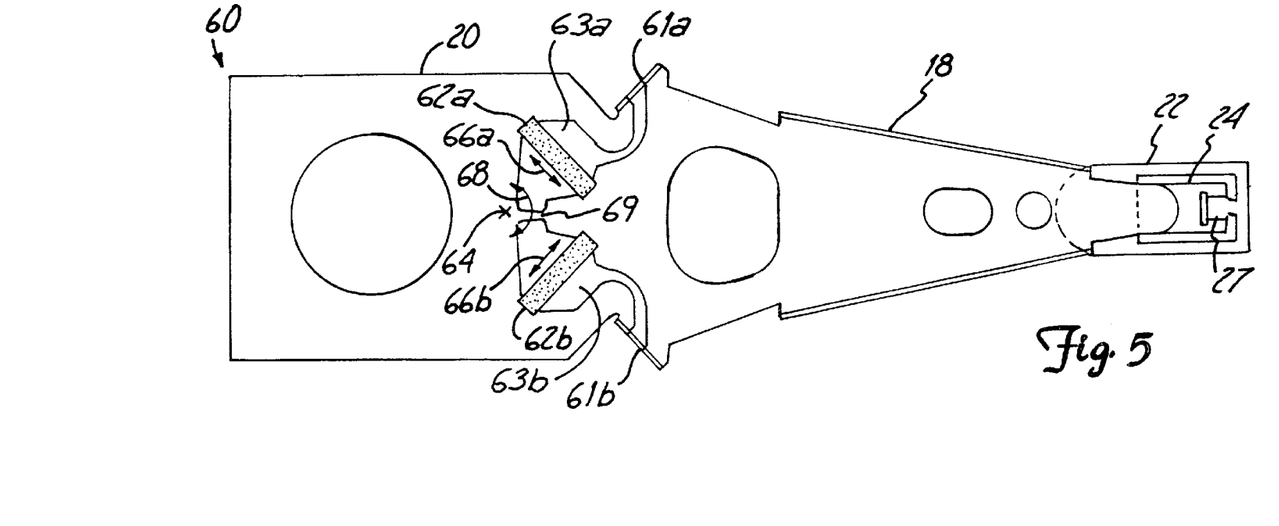
FIG. 5 is a top view of a microactuation system for use in a dual-stage disc drive actuation system for high resolution positioning of a slider according to a third embodiment of the present invention.

FIG. 5 is a top view of microactuation system 60 for use in a dual-stage disc drive actuation system for high resolution positioning of slider 24 according to a third embodiment of the present invention. Beams 61a and 61b are arranged to connect head suspension 18 to head mounting block 20. Head mounting block 20, beams 61a and 61b and head suspension 18 may be formed of a single sheet of material, with beams 61a and 61b bent normal to the general plane of head mounting block 20 and head suspension 18, similar to beams 41a and 41b shown in FIGS. 2 and 3. Apertures 63a and 63b are located adjacent beams 61a and 61b, respectively, between head mounting block 20 and head suspension 18. Beams 61a and 61b are oriented at an angle to each other, such that virtual pivot 64 is formed at the intersection of two lines continued from beams 61a and 61b. Beams 61a and 61b present a stiffness to resist movements other than rotation about virtual pivot 64. Piezoelectric elements 62a and 62b are connected between head mounting block and head suspension 18, generally perpendicular to beams 61a and 61b, respectively, across apertures 63a and 63b, respectively. Piezoelectric elements 62a and 62b are deformable longitudinally in the directions of arrows 66a and 66b, respectively, in response to an applied voltage across the elements. Hinge beam 69 is provided between head mounting block 20 and head suspension 18 along a central longitudinal axis of microactuator 60, dividing apertures 63a and 63b. Expansion and contraction of piezoelectric elements 62a and 62b results in deformation of beams 61a and 61b and of hinge beam 69, causing rotation of head suspension 18 and slider 24 about virtual pivot 64 in the direction of arrows 68. Thus, a controlled voltage applied to piezoelectric elements 62a and 62b may be utilized to effect high resolution positioning of a transducing head carried by slider 24.

Microactuation system 60 shown in FIG. 5 is similar to microactuation system 50 shown in FIG. 4, except for the addition of hinge beam 69. The extra beam 69 reduces the compliance of microactuation system 60 in moving slider 24 across tracks of a disc, but further stiffens the microactuator structure against unwanted resonances and other forces out of the plane of cross-track movement and helps to transmit the moment from the pre-load force on head suspension 18 through head mounting block 20 to actuator arm 16 (FIG. 1).

Figure 6:
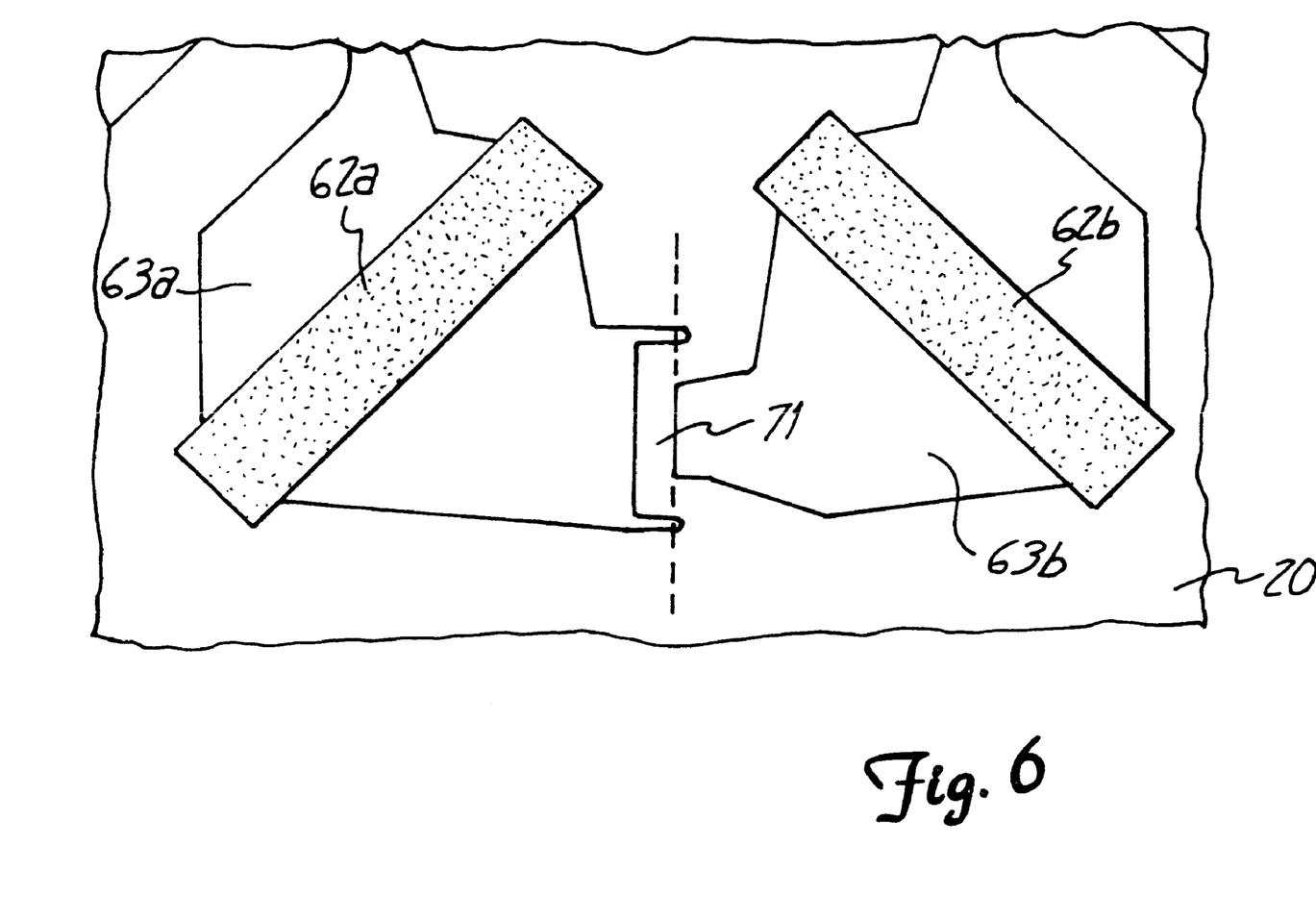
FIG. 6 is a top view illustrating a variation of the third embodiment of the present invention shown in FIG. 5.

FIG. 6 is a top view illustrating a variation of microactuation system 60 shown in FIG. 5. Hinge beam 69 (FIG. 5) is replaced by out-of-plane hinge beam 71, which is shown in FIG. 6 in a flat position between apertures 63a and 63b before being bent up out of the general plane of head mounting block 20 and head suspension 18. By bending beam 71 normal to the general plane of head mounting block 20 and head suspension 18, in the same general manner as the out-of-plane configuration of beams 41a and 41b shown in FIGS. 2 and 3, the additional stiffness presented by beam 71 to resist movement of slider 24 across the tracks of a disc is minimized.

Figure 7:
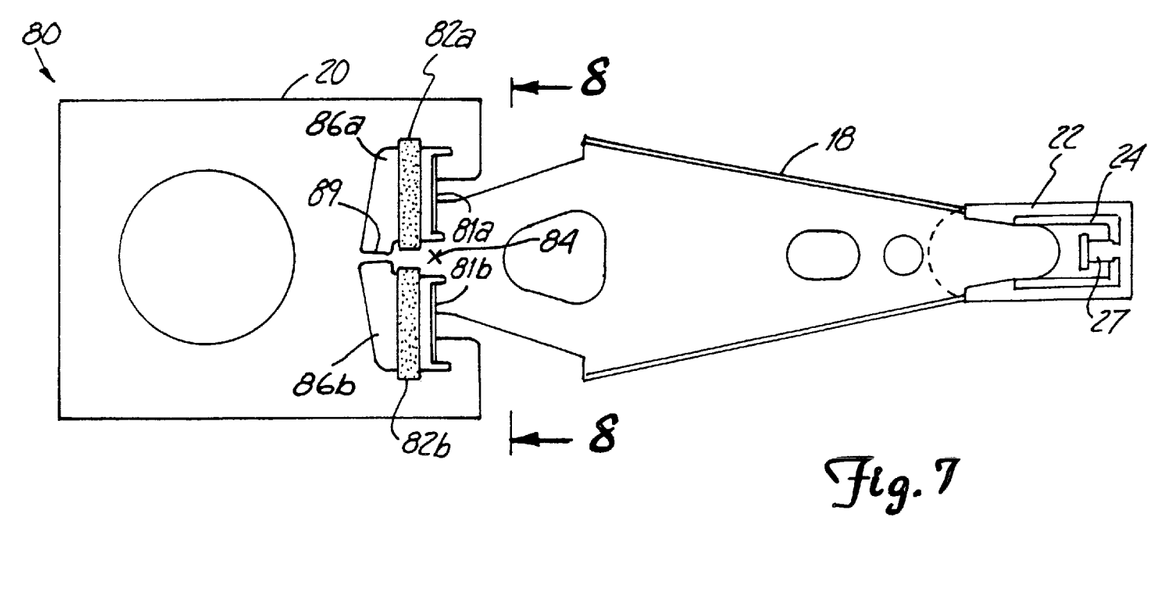
FIG. 7 is a top view of a microactuation system for use in a dual-stage disc drive actuation system for high resolution positioning of a slider according to a fourth embodiment of the present invention.
Figure 8:
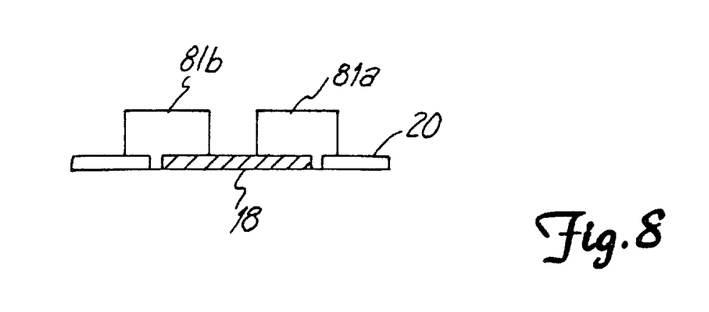
FIG. 8 is a side view taken along line 8—8 of FIG. 7 with intersecting portions shown in section.

FIG. 7 is a top view, and FIG. 8 is a side view taken along 8—8 of FIG. 7 with intersecting portions shown in section, of microactuation system 80 for use in a dual-stage disc drive actuation system for high resolution positioning of slider 24 according to a fourth embodiment of the present invention. Beams 81a and 81b are arranged to connect head suspension 18 to head mounting block 20. Head mounting block 20, beams 81a and 81b and head suspension 18 may be formed of a single sheet of material, with beams 81a and 81b bent normal to the general plane of head mounting block 20 and head suspension 18, with apertures 83a and 83b adjacent beams 81a and 81b, respectively, between head mounting block 20 and head suspension 18. Beams 81a and 81b therefore have a height extending out of the general plane of head suspension 18 and head mounting block 20. Piezoelectric elements 82a and 82b are connected between head mounting block 20 and head suspension 18 across apertures 83a and 38b, respectively, generally parallel to beams 81a and 81b. Piezoelectric elements 82a and 82b are deformable longitudinally in response to an applied voltage across the elements. Deformation and bending of piezoelectric electric elements 82a and 82b results in deformation of beams 81a and 81b and of hinge beam 89, causing rotation of head suspension 18 and slider 24 about virtual pivot 84 to effect high resolution positioning of a transducing head carried by slider 24.

The various configurations of the present invention therefore provide a mechanism for positioning a transducing head carried by slider 24 with a great deal of precision. The mechanism is compliant in the direction of head movement to allow sufficient movement in response to a force generated by piezoelectric elements, but is stiff and resistant to undesired forces in other directions. This is achieved by providing beams connected between head suspension 18 and head mounting block 20 that have a height extending out of the general plane of head suspension 18 and head mounting block 20. The out-of-plane height of the beams is preferably greater than the thickness of the beams, and this configuration is achieved in one preferred embodiment by bending the beams up, perpendicular to the plane of head suspension 18 and head mounting block 20. By providing the additional stiffness against forces in directions other than the movement of slider 24, such as in a direction perpendicular to the surface of the rotating disc, head suspension 18 may be constructed of conventional materials having a thickness on the order of 0.0020 inches to 0.0025 inches in one embodiment (rather than the 0.0030 or thicker load beams that had to be used in the prior art that utilized beams that were fully in the same general plane as head suspension 18 and head mounting block 20), or possibly even less in other embodiments. The resulting microactuator has superior performance characteristics and is readily manufacturable.

The above description of the present invention has focused on a number of preferred embodiments. It should be understood that a number of other configurations may potentially be employed that embody the principles and concept of the present invention, which is to provide at least one beam between a disc drive slider and the block to which it is mounted, the beams being compliant to permit rotation of the slider with respect to the mounting block while being inclined with heights that extend out of the general plane of the mounting block to resist movements and vibrations in other directions. Active elements such as piezoelectric elements are connected between the movable portion supporting the slider (such as a head suspension) and the head mounting block, and expansion or contraction of the piezoelectric elements results in deformation of the beams. The beams are arranged with respect to each other to establish a virtual pivot point where lines extending from the beams intersect, so that deformation of the beams due to expansion or contraction of the piezoelectric elements causes rotation of the movable portion about the virtual pivot point. The number of beams utilized, the choice of expandable elements, and the exact location and arrangement of the beams are parameters that may be modified in the implementation of the present invention. While a number of preferred embodiments utilizing two beams and two piezoelectric elements are shown, it should be understood that one beam or more than two beams, as well as one expandable element or more than two expandable elements may be employed and are contemplated by the present invention.

Although the present invention has been described with reference to preferred embodiments, workers skilled in the art will recognize that changes may be made in form and detail without departing from the spirit and scope of the invention.

What is claimed is:

1. A disc drive mechanism for high resolution positioning of a transducing head carried by a slider with respect to a track of a rotatable disc having a plurality of concentric tracks, comprising:
   an actuator arm, head mounting block and head suspension for supporting the slider over the rotatable disc;
   means for mechanically connecting the head suspension to the actuator arm at the head mounting block; and
   means for selectively deforming the means for mechanically connecting the head suspension to the actuator arm in order to alter a position of the head suspension with respect to the actuator arm for fine positioning of the slider adjacent to the track of the rotatable disc.

2. A microactuator for selectively altering a position of a transducing head carried by a slider in a disc drive system with respect to a track of a rotatable disc having a plurality of concentric tracks, the disc drive system including a head mounting block for attachment to an actuator arm and a head suspension supporting the slider over the rotatable disc, the microactuator comprising:
   a first piezoelectric element attached between the head mounting block and the head suspension, the first piezoelectric element being deformable in response to a voltage applied thereto; and
   a first beam attached between the head mounting block and the head suspension, the first beam being flexible to permit movement of the head suspension with respect to the head mounting block and having a height that extends out of a general plane of the head mounting block and the head suspension.

3. The microactuator of claim 2, further comprising:
   a second piezoelectric element attached between the head mounting block and the head suspension, the second piezoelectric element being deformable in a direction complementary to deformation of the first piezoelectric element in response to a voltage applied thereto; and
   a second beam attached between the head mounting block and the head suspension, the second beam being flexible to permit movement of the head suspension with respect to the head mounting block and having a height that extends out of a general plane of the head mounting block and the head suspension.

4. The microactuator of claim 3, wherein the first beam and the second beam are arranged to establish a virtual pivot point that is closer to the slider than the first and second beams.

5. The microactuator of claim 3, wherein the first beam and the second beam are arranged to establish a virtual pivot point that is further from the slider than the first and second beams.

6. The microactuator of claim 2, further comprising a hinge between the head mounting block and the head suspension along a central longitudinal axis of the head mounting block and the head suspension.

7. The microactuator of claim 6, wherein the hinge has a height extending out of the general plane of the head mounting block and the head suspension.

8. The microactuator of claim 2, wherein the head suspension has a thickness between 0.0020 inches and 0.0025 inches.

9. A microactuator for selectively altering a position of a transducing head carried by a slider in a disc drive system with respect to a track of a rotatable disc having a plurality of concentric tracks, the disc drive system including a head mounting block for attachment to an actuator arm and a head suspension supporting the slider over the rotatable disc, the microactuator comprising:

a plurality of beams connecting the head suspension to the head mounting block, the beams having a thickness and a height that extends out of a general plane of the head mounting block and the head suspension, wherein the beams are oriented at an angle to one another to form a virtual pivot point at an intersection of two lines extending from the beams; and at least one piezoelectric element connected between the head suspension and the head mounting block, the at least one piezoelectric element being deformable in response to a voltage applied thereto to cause bending of the beams and thereby effect rotation of the head suspension about the virtual pivot point.

10. The microactuator of claim 9, wherein the thickness of the beams is less than the height of the beams.

11. The microactuator of claim 9, wherein the beams are arranged such that a distance from the slider to the virtual pivot point is less than a distance from the slider to the beams.

12. The microactuator of claim 9, wherein the beams are arranged such that a distance from the slider to the virtual pivot point is greater than a distance from the slider to the beams.

13. The microactuator of claim 9, further comprising a hinge connected between the head mounting block and the head suspension.

14. The microactuator of claim 13, wherein the hinge has a height that extends out of the general plane of the head mounting block and the head suspension.

15. The microactuator of claim 9, wherein the head suspension has a thickness between 0.0020 and 0.0025 inches.

* * * * *